United States Patent Office 3,822,204
Patented July 2, 1974

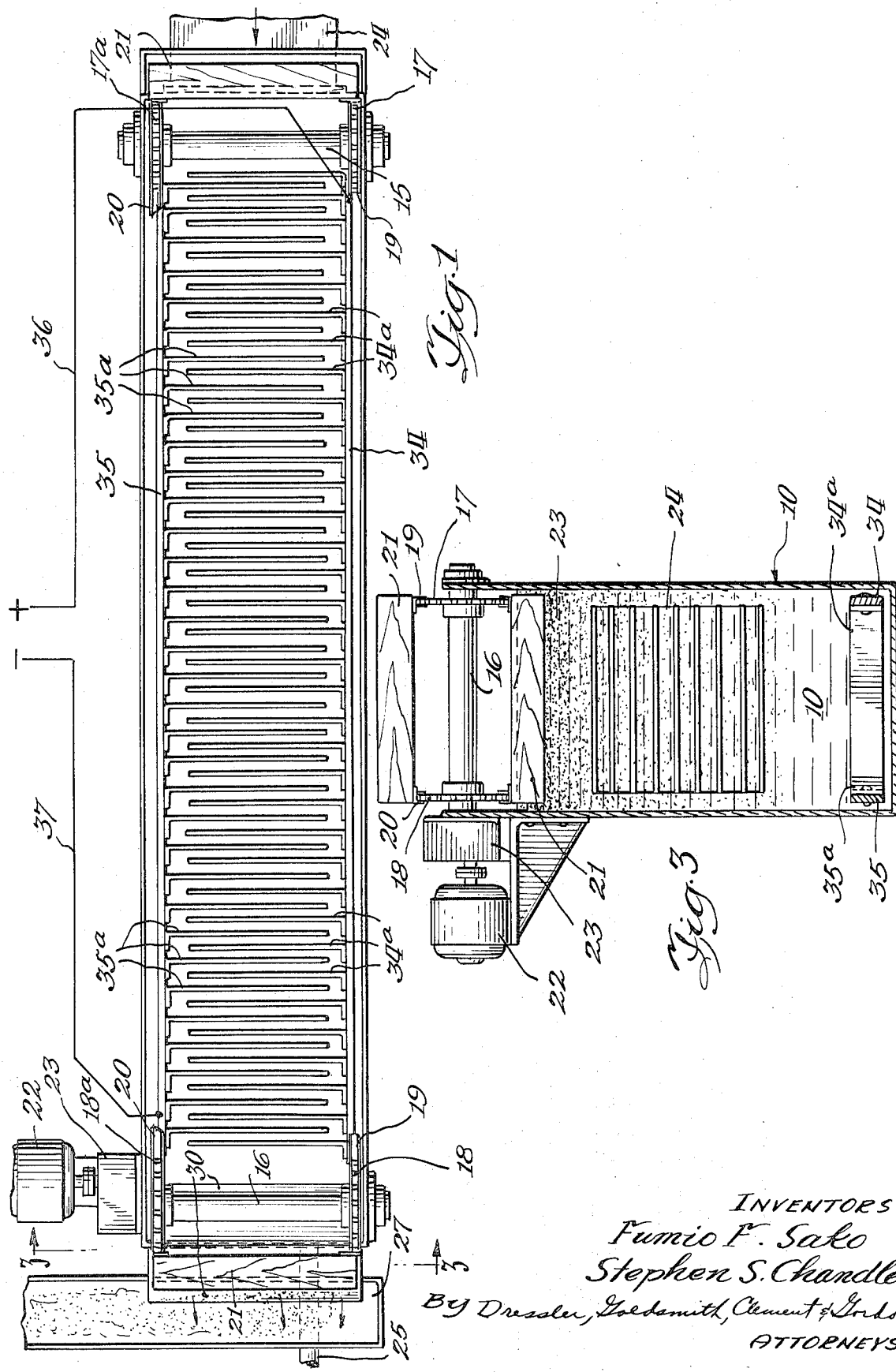

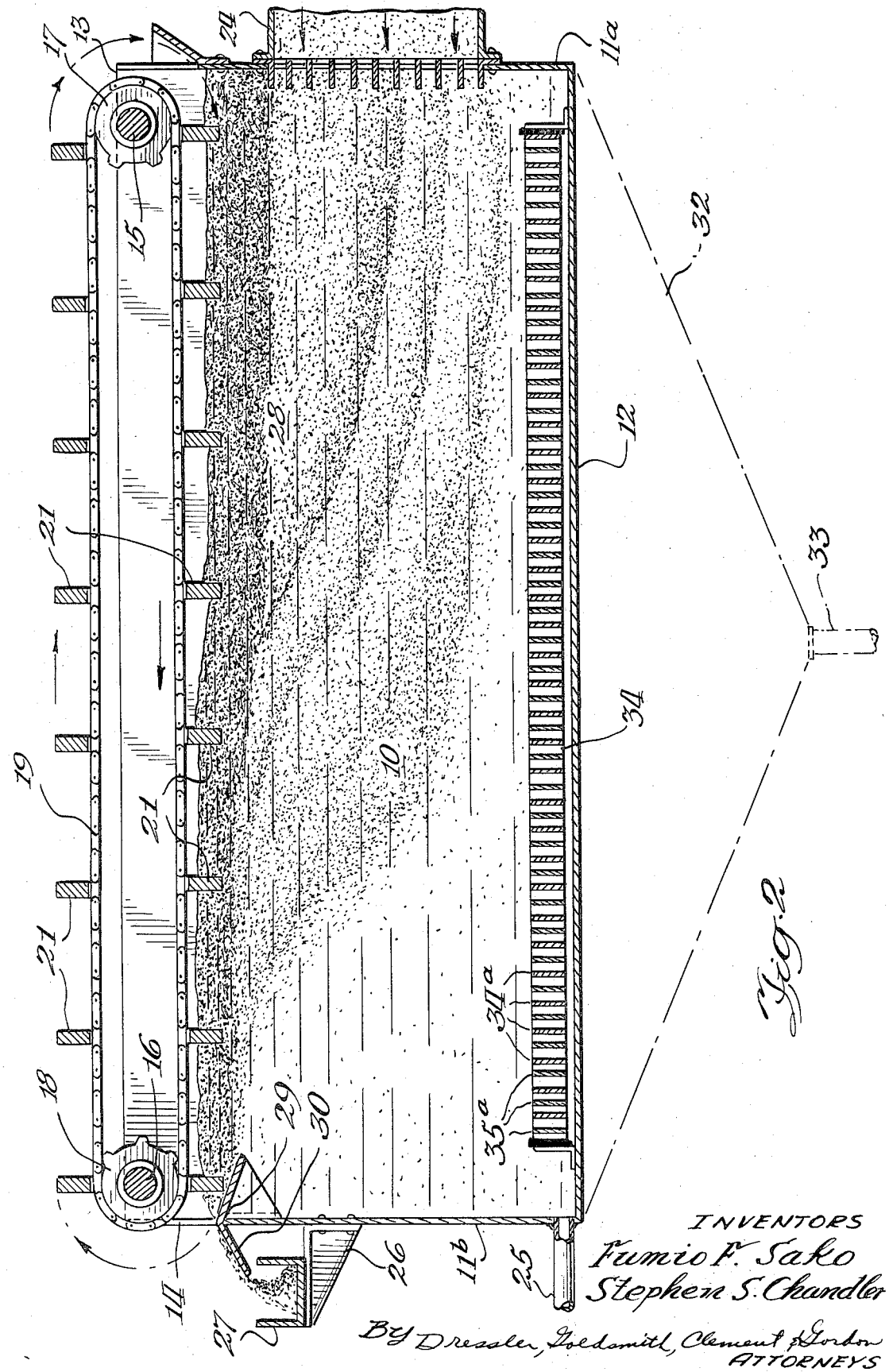

3,822,204
METHOD AND APPARATUS FOR SEPARATION OF SLUDGE
Fumio F. Sako, San Jose, and Stephen S. Chandler, Los Altos, Calif., assignors to FMC Corporation
Continuation of abandoned application Ser. No. 584,774, Oct. 6, 1966. This application June 12, 1970, Ser. No. 45,882
Int. Cl. B03d 1/00; C02c 1/28
U.S. Cl. 210—44
21 Claims

ABSTRACT OF THE DISCLOSURE

An apparatus for separating a sludge-containing liquid medium produced by the processing of sewage into a clarified liquid and a sludge concentrate. Companion electrodes in the bottom of the container produce gas by electrolysis of water which rises as dispersed bubbles and upon occlusion to sludge particles floats the particles to the liquid surface. Sludge concentrate floating adjacent the surface of the liquid medium is moved out of the container by a skimmer and clarified liquid is discharged from the lower portion of the container.

---

This application is a continuation of our application entitled Method and Apparatus for Separation of Sludge, Ser. No. 584,774, filed Oct. 6, 1966, now abandoned.

This invention relates to the treatment of aqueous waste materials. More particularly, it relates to a system for segregating sludges formed in systems for treatment of domestic sewage and industrial wastes. Still more particularly, it relates to a method of creating a concentrate of sludge in a buoyant floating form and to apparatus for effecting flotation of the sludge and separation of the floating sludge concentrate from a clarified effluent.

Briefly, the invention comprises flowing an aqueous medium containing biological sludge into a body of aqueous medium through which gaseous products of electrolysis are rising, accumulating the biological solids floating to the surface of the liquid as a sludge concentrate and separating the floating solids from the resulting clarified liquid which is substantially free of suspended biological solids.

In the treatment of sewage, whether of the industrial or domestic type, the primary purpose of treatment is to eliminate putrescible matter and form solids which can be separated from a supernatant liquor or effluent by such conventional means as decantation, settling, filtration, etc.

Segregation of suspended sewage sludge solids containing biochemical decomposition products in a primary settler, in a secondary settling tank following secondary treatment by, for example, the activated sludge process, or in a settler following aerobic digestion, are time consuming operations. For example, in the activated sludge process for every volume per minute of entering aqueous sewage, it is necessary to provide 120 volumes or more of settling tank capacity. In addition, the area of the holding settling tank becomes important because an upward flow rate per unit of area for liquid cannot be such as to prevent sludge settling and interfere with maintenance of a substantially continuous sludge blanket. The apparatus required to handle settling, therefore, accounts for one of the major parts of the sewage processing plant costs.

In addition to structural costs, changes in the nature of sewage entering a plant can alter the, for example, aeration tank mixed liquor with the result that the settling character of the sludge may be changed. If the SVI goes up, the sludge will be slower in settling and may result in only partial settling and the consequent discharge of appreciable quantities of solids in the effluent.

Attempts have been made to shorten the time required for separation of solids from aqueous wastes by electrophoresis and by passage of the aqueous waste through an electrical field with simultaneous presence of ultrafine gas bubbles. In the latter situation, liquid is conducted through a vessel wherein the cathode is situated at the bottom and the anode is situated at the surface. In such a system, flocculation of impurities is asserted to occur in approximately 2 to 10 minutes when current densities of 1 to 15 amperes per dm.$^2$ of electrode area are applied.

Another system for purifying sewage water is known which is based upon use of an electrodialysis cell. This system is applied to sewage waters from which the greater portion of the solids have been removed, as by filtration. The substantially solids-free sewage water is mixed with sea water and passed through a dialysis cell. This cell has a perforated iron diaphragm positioned between the anode and cathode to separate the space into elongated anode and cathode compartments. Sea water is directed through the anode compartment and a mixture of sea water and sewage water is directed through the cathode department. A product asserted to be $MgNH_4PO_4$ is removed as a floating scum from water leaving the dialysis cell. This apparatus has an electricity consumption of 200 amperes hours/cm.$^3$ or 0.75 ampere hours/gallon of sewage treated electrically, causing the system to have high operating costs. The dialysis cell is ineffective for treatment of suspensions such as mixed liquor because the solids can clog the compartments. Further consumption of electricity when the liquid medium is a slurry is increased to a point making the system economically unattractive.

Neither of these systems has proven economically feasible. Power consumption has made the cost prohibitive at electric power rates charged in the United States, and the small quantities of liquid which can be handled per unit of time prohibit application to commercial sewage treating systems.

Now it has been discovered that domestic sewage sludge solids and industrial wastes containing biochemical decomposition products such as would be subject to segregation in the settling tanks, as previously described, or the solids present in liquors produced by aerobic or anaerobic digestion, can be segregated for effective removal from its associated liquid irrespective of the settleability of the sludge, as, for example, indicated by SVI, i.e., separated into a sludge concentrate and a low solids content effluent, by introducing the sludge-containing liquid into a body of liquid, through which rise fine bubbles produced by electrolysis of said aqueous medium in quantities capable of floating the sludge and of producing a gaseous bubble zone to prevent substantial contact of biological sludge with the electrolysis electrodes.

In this method of concentrating and/or densifying sludge, the first step is establishing a body of aqueous medium. Then gas bubbles resulting from decomposition of water at electrodes submerged in said aqueous medium are produced which will ascend toward the surface of the aqueous medium. When a zone substantially free of suspended solids is established in the vicinity of the electrodes, influent liquor is introduced at a point intermediate the surface of the liquid and said electrodes. A gas bubble dispersion is caused to rise toward the liquid surface when influent liquor is being introduced so that the sludge occludes gas bubbles, is floated upwardly and is accumulated as a slude concentrate floating adjacent the surface of the body of medium. The floating sludge concentrate is separated from the surface of the liquid in quantities to maintain a substantially sludge-free liquid zone between the bottom of the sludge blanket, i.e., floating concentrate of sludge, and said electrodes.

The method of operation and the apparatus for carrying out that method are here described for the purpose of illustrating a preferred embodiment as applied to the separation of sludge from the mixed liquor produced in an activated sludge process.

Aqueous waste entering the activated sludge plant, after screening, comminuting, degritting and primary clarifying, flows to an aeration basin or zone wheer it is mixed with activated sludge previously separated from aerated mixed liquor, and aerated.

The aerated mixture of recycle sludge and influent sewage, the so-called mixed liquor, is conventionally settled in a secondary clarifier or settling zone.

In a system operating with about 2000 p.p.m. of solids in the mixed liquor, a separation producing an effluent suitable for discharge to a water course is being produced when a settled sludge is recovered, after an average residence time for mixed liquor in the settling tank of about 2 hours, with a concentration greater than the influent liquor and an effluent overflowing the weir with a solids content of usually less than 20 mg./liter.

In accordance with this invention, the mixed liquor discharged from said aeration zone is fed into apparatus for separation and densification of sewage sludge, for example, into a chamber filled at the start with suitable liquid, at a point adjacent to but below the liquid surface. This chamber is provided with electrodes, i.e., side by side anodes and cathodes.

A difference of potential is imposed across the respective electrodes and current is passed in quantities to decompose water and produce fine bubbles of hydrogen and oxygen which rise in a dispersed form through the aqueous medium. Such dispersions of gas should have a distribution in quantity and of size of bubbles such that gas bubble channeling or breakthrough in the sludge blanket floating adjacent to the surface of the liquid is avoided.

Tihs chamber has the electrodes positioned a predetermined distance below the liquid surface. The electrodes may be in side by side arrangement, i.e., anode and cathode at the same elevational level or have the anodes and cathodes at different elevational levels. When a difference in potential is imposed between the electrodes and electric current flows, electrodes having a proper configuration will produce fine bubbles of gas, i.e., hydrogen gas forming at the cathode and oxygen gas forming at the anode. Such electrodes may take the form of grilles, plates, etc. These electrodes may be uniformly spaced over the bottom of the tank or non-uniformly positioned as sets of anodes and cathodes, for example, positioned to create a higher concentration of bubbles at the inlet end of the tank than at the outlet end of the tank. Such electrode positioning arrangements are an alternative to varying the power input as hereinafter explained.

In the operation of this system for separation of sludge, withdrawal of a clarified effluent is from a quiescent zone so that solids are not entrained.

After the mixed liquor enters the flotation tank, the sludge may travel at a rate such that it tends initially to settle toward the electrodes. As the sludge material is contacted by and has bubbles of gas adhered or occluded to it, a definite profile or lower limit of sludge blanket materializes, for example, a mixed liquor of 1500 to 3000 mg./liter after 10 to 20 minutes residence time in the flotation tank can produce a layer having a solids concentration in the range of 20,000 to 35,000 mg./liter or more in the sludge blanket zone. If such a sludge concentrate is similarly treated in a second flotation tank in series, the sludge solids can be further densified, for example, to between 40,000 and 80,000 mg./liter, i.e., to a sludge of 4% to 8% solids.

The apparatus adapted to carry out the method of accumulating sludge as a concentrate floating adjacent to the normal liquid level of a body of liquid and having a clarified liquid layer therebelow comprises a tank or container, companion anode and cathode electrodes for decomposition of water positioned in said tank at an area removed from said normal liquid level, said electrodes being arranged to span a substantial part of the bottom of said tank, a source of electrical liquor intermediate said normal liquid level in said tank and said electrodes, an outlet for clarified liquid at a point remote from said inlet and positioned elevationally in the region of clarified liquid, and means for removing floating sludge from the zone adjacent the normal liquid level in said tank.

A primary essential to the flotation operation of this invention is that a zone of gas bubbles be interposed between the suspended particles and the electrodes. The formation of such a zone of bubbles will be dependent upon the voltage or potential difference between the electrodes and the electric current flowing and can be adjusted to handle increased volume of mixed liquor throughputs or mixed liquors of higher solids content.

Current consumption is based upon the requirement for gaseous bubbles in quantities to insure that no substantial portion of the sludge comes in contact with the electrodes and to obtain a sludge blanket above a clarified liquid. When using side by side electrodes in a tank where the pH is between 5 and 8, i.e., the normal pH of mixed liquor, operating at the low voltage required in the range between 2 and 10 volts, preferably less than about 5 volts, current consumption per gallon of sewage having a solids content in the range between 1500 and 2500 p.p.m. is in the range of 0.1 ampere to 0.3 ampere hour per gallon of tank throughput. At higher solids content in the range between 2500 p.p.m. and 5000 p.p.m., the current consumption (i.e., D.C. current) is in the range between 0.3 ampere hours and 0.6 ampere hours per gallon of throughput. Bubble concentration may be varied by varying the power input. Such variation may be accomplished by controlled changes in amperage provided to electrodes in various sections of the tank. When such a system has been operated for some time, electrodes may become coated by foreign material. Electrodes may be cleaned of such material by reversing the polarity of the electrodes for a short cleaning period. Relating this to a pound of sludge solids basis, the power required to obtain an effluent containing less than 20 mg./liter of insoluble solids, when feeding mixed liquor of solids content in the range between 1500 and 5000 mg./liter, is in the range between about 0.08 kw. hours to 0.26 kw. hours per pound of sludge solids.

Liquid being passed through the flotation cell must be so directed that there is no short circuiting of the tank and the velocity must be held to levels which do not create turbulence that will disrupt the sludge blanket. Velocity of liquid moving through the zone intermediate the electrodes and the sludge blanket must be such that the majority of the bubbles will reach the surface of the liquid before they are carried to the outlet end of tank as entrained bubbles. While the cross-sectional configuration is not of significant importance, for the tank can be circular, square or rectangular, a useful form of tank is one in which the mixed liquor is passed through rectangular units, preferably with the feed distributed evenly and over a large portion of the tank cross section in the direction of flow. When a tank is designed for a relatively long flow path for floating solids, it is possible to obtain sludge blankets with solids density varying from area to area. Such variations in density of solids permits appreciable latitude in choosing sludge for recycle and sludge for wasting.

In such a tank, where the electrodes are positioned relative to one another for maximum effectiveness in producing gas bubbles by electrolysis of water, the positioning is generally governed by the flow path, solids will follow through a tank in view of the positioning of the inlet or inlets and the outlet or outlets. In operation, in accordance with this invention, it is not necessary that the clarified effluent pass between electrodes before being discharged from the flotation tank. Consequently, the electrodes are positioned at any depth in a tank between the inlet level and the bottom of the tank. The electrodes can be in a horizontal position or a position transverse to the horizontal axis and can be side by side in parallel positions in horizontal, vertical or other non-horizontal positions. Preferably, the electrodes are positioned side by side in the bottom of a tank and extend transverse to the direction of flow of liquid through the tank. Such positioning insures the presence of an effective dispersion of gas below the entire path for movement of sludge through the tank, although positioning in the direction of the flow path for sludge through the tank is also operable.

Effluent of acceptable quality can be discharged from the bottom of the tank and below the electrodes or at any level intermediate the bottom of the sludge blanket being maintained by the rising bubbles and the electrodes. As a safety factor to insure against surges in the feed, either of volume or solids content, it is preferred to maintain a clear body of liquid of at least 6 inches above the electrodes.

When operating in a rectangular cross-sectional configuration tank of 3 foot depth, at a power input of 0.6 kg. per gallon with electrodes arranged in the transverse direction of flow, an effluent of best quality, e.g., 4 mg./liter is produced as compared to effluents of 12 mg./liter and 20 mg./liter, respectively, when the horizontal flow is uniform and when electrodes are angled upwardly to produce an increasing horizontal velocity as solids are removed.

The apparatus useful in carrying out the invention is schematically presented in the accompanying drawings in which:

FIG. 1 is a top plan of a sewage flotation tank;
FIG. 2 is a vertical sectional view through the tank of FIG. 1; and
FIG. 3 is a view along the line 3—3 of FIG. 1.

Referring to FIG. 1 of the drawings, the numeral 10 indicates a rectangular tank with dimensions of width, length and height in the ratio of 1:4:1.5.

Tank 10 is open at the top and is adapted with end walls 11a and 11b and a bottom 12, illustrated as a flat surface. Bottom 12, however, can have other configurations such, as example, a hopper bottom extending downwardly in a truncated pyramidal configuration with the effluent outlet positioned at the apex of the pyramid whereby settled material may be removed from the tank.

Walls 11a and 11b support bracket members 13 and 14, respectively. Bracket members 13 and 14 each support bearings in which are mounted rotatable shafts 15 and 16. Mounted on shafts 15 and 16 are sprocket wheels 17 and 17a and 18 and 18a.

A drive chain 19 is trained over sprockets 17 and 18, and a companion drive chain 20 is trained over sprocket wheels 17a and 18a, respectively.

Drive chains 19 and 20 support between them scraper blades 21 which depend into the liquid when moving along the lower reach.

A motor 22 is connected through a gear box 23 for rotation of shaft 16 for driving chains 19 and 20.

Liquid containing suspended solids enters tank 10 through conduit 24 whose inlet to the tank 10 may be provided with flow directing vanes. Clarified effluent is discharged through conduit 25.

End wall 11b is adapted with a bracket 26 which supports a trough 27 for collecting and conveying concentrated sludge 28 to a station for further processing or for disposal as by incineration.

Concentrated sludge 28 floating in the liquid in tank 10, as it approaches the end wall 11b, is forced by the blades 21 of the sludge conveying mechanism over a weir 29. Sludge 28 after passing over the weir 29, slides down an apron 30 into collection trough 27. The rate of travel of the blades 21 should be variable so that predetermined residence times for floating solids in the tank can be established based upon the desired degree of densification.

Tank 10 is illustrated as having a flat bottom 12. Some feeds may contain sufficient inert solids to warrant utilizing a bottom 32, illustrated in broken lines of a truncated pyramidal configuration with an effluent outlet 33 at the apex of the pyramid.

Adjacent the bottom of tank 10 are positioned conductor members 34 and 35 and interleaved electrodes 34a and 35a which extend transverse to the direction of liquid flow through the tank and have the alternate electrodes connected to a common conductor member. Conductor member 34 is connected through an electrical conduit 36 to a source of electricity so as to act as anodes in the electrolytic tank. Conductor member 35 is connected through electrical conduit 37 to a source of electricity so as to act as cathodes in the electrolytic tank. The electrodes may be cast iron members or may be anodes and cathodes plated with nickel and cobalt, respectively. If the tank is provided with a flat bottom over most of its area, a sump may be provided and conveying means positioned intermediate the electrodes and the tank bottom to move accumulated inert settled material to a removal sump.

When mixed liquor having a solids content of approximately 1400 p.p.m. of activated sludge is introduced into a sludge flotation chamber of the type discussed having a capacity of 60 gallons, at a rate of 3 gallons per minute and current consumption is set at a rate of 0.2 ampere hours per gallon, at 4.8 volts, the flotation operation can produce about 3 gallons per minute of effluent having 12 mg./liter of suspended solids and a sludge concentrate in a total volume of about 0.11 g.p.m. having a solids content of 42,000 p.p.m.

Operation of the sludge flotation system for separation of sludge alone has been described in detail. If it is desirable to remove phosphates from the effluent being discharged to a body of water, effluent from a flotation tank may be rendered alkaline by the addition of water soluble compounds such as magnesium hydroxide which will form $MgNH_4PO_4$, a product which appears in the solution as floatable solids. These solids may be floated in the same manner as hereinbefore described for biological sludge solids. If it is desired to combine the sludge removal with phosphate removal, magnesium hydroxide may be added to the influent liquor being introduced into the sludge flotation tank.

In systems operating to produce a recycle sludge substantially free of phosphates, the sludge obtained by conventional separation is usually elutriated with water and again concentrated. Such concentration may be effectively carried out in the apparatus herein described.

The above-detailed description has been given by way of illustration without any intention that the invention be limited to the exact conditions set forth. No unnecessary limitations should be understood therefrom, as modifications will be obvious to those skilled in the art.

We claim:
1. The method of concentrating sludge containing biochemical decomposition products comprising maintaining a body of aqueous medium, establishing an essentially horizontal flow path for sludge through said body of aqueous medium passing from an inlet to a sludge outlet, producing a dispersion of gas bubbles by electrical decomposition of water at electrodes submerged in said aqueous medium and positioned to insure production of a dispersion of gas bubbles below substantially the entire flow path for sludge, introducing an influent liquid containing sludge into said body of aqueous medium at a level intermediate the surface of said liquid and the level of said electrodes whereby ascending gas bubbles contact and are occluded by said sludge and the sludge is floated to the surface of said body of aqueous medium thereby creating a zone adjacent said electrodes substantially free of suspended sludge, removing said sludge floating at the surface of the liquid and discharging aqueous medium rendered substantially free of suspended sludge from said zone adjacent said electrodes.

2. The method of claim 1 wherein gas bubbles are produced along perforate electrodes which extend as a horizontal source of bubbles below the entire flow path for movement of sludge and withdrawal of aqueous medium rendered substantially free of suspended sludge is from below the level of said electrodes.

3. The method according to claim 1 wherein concentration of biological sludge is carried out in two stages, wherein sewage sludge is introduced into the first stage and a preliminary concentrate of sludge passes to a second stage operating in the same manner for further concentration.

4. The method according to claim 1 wherein the sewage sludge introduced is mixed liquor of pH between about 5 and 8 produced by the aeration stage of an activated sludge process.

5. Apparatus for accumulating biological sewage sludge as a concentrate floating at the surface of a body of liquid in a tank with a clarified liquid layer therebelow which comprises a horizontally disposed tank, companion anode and cathode electrodes for electrical decomposition of water positioned in said tank at a level removed from the surface of said liquid and above the bottom of said tank, said electrodes being arranged to produce a dispersion of gas substantially below the entire flow path for sludge through said tank, a source of electrical current connected to said electrodes, an inlet for influent liquor at one side of said tank at a point intermediate the liquid surface level being maintained for the body of liquid in said tank and the level of said electrodes, an outlet for clarified liquid at an opposite side of said tank and means for removing floating sludge from the surface of the liquid in said tank.

6. Apparatus according to claim 5 wherein said outlet for clarified liquid is below the level of said electrodes.

7. Apparatus according to claim 5 wherein the bottom of the tank is formed as a hopper extending downwardly in a truncated pyramidal configuration with an effluent outlet at the apex of the pyramid.

8. Apparatus according to claim 5 wherein the tank at the end removed from the inlet is provide with an upwardly sloping guide and a bladed conveying member whereby sludge concentrate trapped between said guide and blades is moved out of said tank.

9. Apparatus for the purification of water comprising a tank, first means for removing sludge from the surface of a body of water in said tank, second means in said tank below the level of said first means and above the bottom of said tank for electrolytically generating and releasing bubbles uniformly throughout the horizontal sectional area of said tank, first conduit means for introducing water to be purified into said tank at a level between said first and second means, and second conduit means for withdrawing purified water from said tank below the level of said second means.

10. Apparatus according to claim 9, said second means including a foraminous baffle extending horizontally and substantially throughout the horizontal sectional area of the tank below the level of said first conduit means and above the level of said second conduit means.

11. Apparatus according to claim 10 and a second foraminous baffle in vertically spaced relation with and parallel to said first named baffle.

12. Apparatus according to claim 11 and means to supply said baffles with electrolytic current of opposite polarity, respectively.

13. The method of purifying water comprising establishing a pool of water to be purified, electrolytically generating flotation bubbles in the pool, at a first level below the surface of the pool and above the bottom thereof, uniformly over the horizontal sectional area of the pool at said first level, withdrawing purified water at a second level below said first level, while introducing water to be purified into the pool at a level between said first level and the surface of the pool, to thereby maintain the surface of the pool at essentially fixed elevation, and removing accumulated sludge floating on the surface of the pool.

14. Apparatus according to claim 9, said second means including an apertured baffle extending horizontally and substantially throughout the horizontal area of the tank below the level of said first conduit means and above the level of said second conduit means.

15. Apparatus according to claim 14 and a second apertured baffle in vertically-spaced relationship and parallel to said first named baffle.

16. Apparatus according to claim 15 and means to supply said apertured baffles with electrolytical current with opposite polarity, respectively.

17. Apparatus for the purification of water comprising a tank, first means for removing sludge from the surface of a body of water in said tank, second means in said tank below the level of said first means and above the bottom of said tank for electrolytically generating and releasing bubbles substantially uniformly throughout the horizontal sectional area of said tank, first conduit means for introducing water to be purified into said tank at a level between said first and second means, and second conduit means for withdrawing purified water from said tank below the level of said second means.

18. Apparatus according to claim 17, said second means including a foraminous baffle extending horizontally and substantially throughout the horizontal sectional area of the tank below the level of said first conduit means and above the level of said second conduit means.

19. Apparatus according to claim 18 and a second foraminous baffle in vertically spaced relation with and parallel to said first named baffle.

20. Apparatus according to claim 19 and means to supply said baffles with electrolytic current of opposite polarity, respectively.

21. The method of purifying water comprising establishing a pool of water to be purified, electrolytically generating flotation bubbles in the pool, at a first level below the surface of the pool and above the bottom thereof, substantially uniformly over the horizontal sectional area of the pool at said first level, withdrawing purified water at a second level below said first level, while introducing water to be purified into the pool at a level between said first level and the surface of the pool, to thereby maintain the surface of the pool at essentially fixed elevation, and removing accumulated sludge floating on the surface of the pool.

References Cited

UNITED STATES PATENTS

| | | | |
|---|---|---|---|
| 3,063,939 | 11/1962 | Katz | 210—10 X |
| 3,505,188 | 4/1970 | Pan | 210—221 X |
| 1,069,169 | 8/1913 | Parker | 210—44 X |
| 1,619,036 | 3/1927 | Ravnestad | 210—44 X |
| 3,347,786 | 10/1967 | Baer et al. | 210—45 |
| 3,035,992 | 5/1962 | Houger | 204—149 |

FOREIGN PATENTS

| | | | |
|---|---|---|---|
| 676,854 | 8/1952 | Great Britain | 204—186 |

THOMAS G. WYSE, Primary Examiner

U.S. Cl. X.R.

210—221

UNITED STATES PATENT OFFICE
CERTIFICATE OF CORRECTION

Patent No. 3,822,204  Dated July 2, 1974

Inventor(s) Fumio F. Sako and Stephen S. Chandler

It is certified that error appears in the above-identified patent and that said Letters Patent are hereby corrected as shown below:

Column 2, line 25, "amperes" should be --ampere--;
Column 4, line 4, after "electrical" insert --current connected to said electrodes, an inlet for influent;
Column 4, line 23, "voltage" should be --voltages--;
Column 5, line 23 "kg." should be --kw--.

Signed and sealed this 1st day of October 1974.

(SEAL)
Attest:

McCOY M. GIBSON JR.
Attesting Officer

C. MARSHALL DANN
Commissioner of Patents